United States Patent Office 3,393,994
Patented July 23, 1968

3,393,994
METHOD OF CONTROLLING WEEDS
Nancy E. Achuff, Oreland, Pa., and Thomas F. Wood, Wayne, N.J., assignors, by direct and mesne assignments, to Givaudan Corporation, Clifton, N.J., a corporation of New Jersey
No Drawing. Filed Sept. 28, 1964, Ser. No. 399,904
7 Claims. (Cl. 71—123)

ABSTRACT OF THE DISCLOSURE

A new class of herbicides is disclosed. The active compounds are acyl indans having the structure:

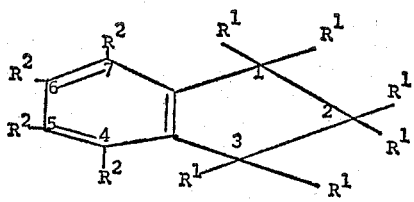

wherein $R^1$ is selected from the group consisting of hydrogen and alkyl radicals of from 1 to 3 total carbon atoms with the proviso that at least one of the $R^1$'s is hydrogen, and wherein $R^2$ is selected from the group consisting of hydrogen, alkyl radicals of from 1 to 6 total carbon atoms, acyl radicals and cyclo-alkyl radicals, with the proviso that at least one of the $R^2$ radicals must be an acyl radical.

Herbicidal test data on a large number of compounds are given in 61 examples.

---

This invention relates to the use of certain compounds for purposes of controlling weeds. More particularly, the invention relates to the use of acyl indane compounds having the structure:

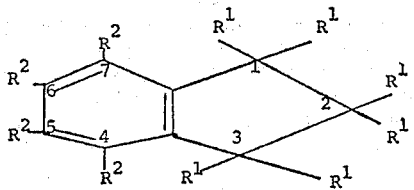

wherein $R^1$ is selected from the group consisting of hydrogen and alkyl radicals of from 1 to 3 total carbon atoms with the proviso that at least one of the $R^1$'s is hydrogen, and wherein $R^2$ is selected from the group consisting of hydrogen, alkyl radicals of from 1 to 6 total carbon atoms, acyl radicals and cyclo-alkyl radicals, with the proviso that at least one of the $R^2$ radicals must be an acyl radical.

The acyl indane compounds of the present invention have been found to possess high levels of herbicidal activity and are useful in controlling undesirable plants of both the monocotyledonous and dicotyledonous species on a preemergence basis. It has also been discovered that the compounds of the present invention possess high rates of herbicidal activity on both emerged and submerged aquatic weed species.

By the term "pre-emergence" is meant that the compound is applied to the soil prior to emergence of the weed species sought to be controlled. This term, as used herein, includes the application of a herbicidal compound falling within the scope of this disclosure to areas wherein useful or desirable plants are either growing or have been sown, but where the undesirable plants sought to be controlled have not as yet emerged.

The herbicidal activity of the compounds of the present invention is demonstrated by the following tests. Seeds of at least two types of common weed varieties from the class of wild oats (*Avena fatua*), cheatgrass (*Bromus secalinus*), foxtail (*Setaria faberii*), barnyard grass (*Echinochloa crusgalli*), crabgrass (*Digitaria ischaemum*), nut grass (*Cyperus esculentus*), Johnson grass (*Sorghum halepense*), curled dock (*Rumex crispus*), yellow rocket (*Barbarea vulgaris*), chickweed (*Stellaria media*), pigweed (*Amaranthus retroflexus*), velvet leaf (*Abutilon theophrasti*) and lambsquarter (*Chenopodium album*) were planted in soil under greenhouse conditions. Immediately after planting, the soil surface was sprayed with aqueous solutions or suspensions of these compounds so as to apply the equivalent of 16 lbs. of the compound under test per acre of soil surface. The aqueous solutions or suspensions were produced by stirring acetone and/or alcohol solutions of these compounds into water. Three weeks after spray application the herbicidal activity of these compounds was determined in comparison with untreated control areas. The observed activity is reported in the following table wherein the average activity rating on two or more of the weed varieties included in the tests is reported as the percent control of growth.

TABLE I

| Example No. | Compound | Percent Total Control of Weeds |
|---|---|---|
| 1 | Check | 0 |
| 2 | 1,1,4,7-tetramethyl-5-indanylmethylketone. | 95 |
| 3 | 1,1,4,6-tetramethyl-5-indanylmethylketone. | 100 |
| 4 | 1,1,2,4,6-pentamethyl-5-indanylmethylketone. | 100 |
| 5 | 1,1,4,6,7-pentamethyl-5-indanylmethylketone. | 100 |
| 6 | 1,1-dimethyl-4,7-diethyl-6-indanylmethylketone. | 100 |
| 7 | 1,1-dimethyl-4,6,7-triethyl-5-indanylmethylketone. | 100 |
| 8 | 1,1,2,4-tetramethyl-5-indanylmethylketone. | 100 |
| 9 | 1,1,4-trimethyl-7-isopropyl-5-indanylmethylketone. | 100 |
| 10 | 1,4-dimethyl-1-ethyl-7-isopropyl-6-indanylmethylketone. | 100 |
| 11 | 1,1,4-trimethyl-6-isopropyl-5-indanylmethylketone. | 100 |
| 12 | 1,1,4,5-tetramethyl-7-isopropyl-6-indanylmethylketone. | 100 |
| 13 | 1,1,2-trimethyl-6-isopropyl-4-indanylmethylketone. | 100 |
| 14 | 1,1,4,6-tetramethyl-7-isopropyl-5-indanylmethylketone. | 95 |
| 15 | 1,1,4,7-tetramethyl-6-isopropyl-5-indanylmethylketone. | 100 |
| 16 | 1,1-dimethyl-4-ethyl-7-isopropyl-5-indanylmethylketone. | 100 |
| 17 | 1,1-dimethyl-4,6-diisopropyl-5-indanylmethylketone. | 100 |
| 18 | 1,1-dimethyl-4,6,7-triisopropyl-5-indanylmethylketone. | 100 |
| 19 | 1,1,4,6-tetramethyl-5-indanylethylketone. | 100 |
| 20 | 1,1,4,7-tetramethyl-6-indanylethylketone. | 100 |
| 21 | 1,1,6-trimethyl-5-indanylmethylketone. | 45 |
| 22 | 1,1-dimethyl-4,6-diisopropyl-5-indanylethylketone. | 100 |
| 23 | 1,1,4,7-tetramethyl-6-indanyl-n-propylketone. | 95 |
| 24 | 1,1,4,6-tetramethyl-5-indanyl-i-propylketone. | 100 |
| 25 | 1,1,4,7-tetramethyl-5-indanyl-i-propylketone. | 100 |
| 26 | 1,1,4,7-tetramethyl-6-indanyl-i-propylketone. | 100 |
| 27 | 1,1-dimethyl-4,6-diisopropyl-5-indanyl-i-propylketone. | 100 |
| 28 | 1,1,4,6-tetramethyl-5-indanyl-n-propylketone. | 100 |
| 29 | 1,1-dimethyl-4,6-diisopropyl-5-indanyl-n-propylketone. | 100 |
| 30 | 1,1,4,7-tetramethyl-6-indanylmethylketone. | 95 |
| 31 | 1,4-dimethyl-1-ethyl-7-isopropyl-5-indanylmethylketone. | 100 |
| 32 | 1,1,4,7-tetramethyl-5-indanylethylketone. | 100 |
| 33 | 1,1,5,6-tetramethyl-4-indanylmethylketone. | 95 |

TABLE I—Continued

| Example No. | Compound | Percent Total Control of Weeds |
|---|---|---|
| 34 | 1,1,5,6-tetramethyl-4-indanylethylketone. | 100 |
| 35 | 1,1,5,6-tetramethyl-4-indanyl-n-propylketone. | 95 |
| 36 | 1,1,5,6-tetramethyl-4-indanylisopropylketone. | 95 |
| 37 | 1,1,2,5,6-pentamethyl-4-indanylmethylketone. | 100 |
| 38 | 1,1-dimethyl-6-isopropyl-4-indanylmethylketone. | 95 |
| 39 | 1,1-dimethyl-6-isopropyl-4-indanylethylketone. | 100 |
| 40 | 1,1-dimethyl-6-isopropyl-4-indanyl-n-propylketone. | 90 |
| 41 | 1,1-dimethyl-6-isopropyl-4-indanylisopropylketone. | 100 |
| 42 | 1,1,4,6,7-pentamethyl-5-indanylethylketone. | 100 |
| 43 | 1,1,4,6,7-pentamethyl-5-indanyl-n-propylketone. | 100 |
| 44 | 1,1,4,6,7-pentamethyl-5-indanylisopropylketone. | 100 |
| 45 | 1,1-dimethyl-4-ethyl-5-indanylmethylketone. | 100 |
| 46 | 1,1,6-trimethyl-4-ethyl-5-indanylmethylketone. | 100 |
| 47 | 1,1-dimethyl-4,6-diisopropyl-7-indanylethylketone. | 100 |
| 47a | 1,1,2,3,4,6-hexamethyl-5-indanylcyclohexylketone. | 90 |
| 47b | 1,1,2,3,3,7-hexamethyl-5-cyclohexyl-6-indanyl-n-amylketone. | 90 |

For practical use as herbicides, the compounds of this invention may be formulated with conventional agricultural carriers to obtain the desired concentration and to facilitate handling. For example, these compounds may be formulated into dusts by combining them with such materials as talc or clays. Wettable powder formulations may be obtained by adding a dispersing or suspending agent to the dust formulations referred to above.

If desired, the compounds of this invention may be applied as spray solutions which can be prepared by dissolving the compounds in suitable solvents, such as water, xylene, methylated naphthalenes, kerosenes, common agricultural oils, etc., in accordance with well established agricultural practices. The choice of solvent to be used will be dictated by the solubility of the compound sought to be sprayed in that particular solvent system. Generally, it has been found that the majority of these compounds have a relatively low order of water solubility, so that the use of common agricultural organic solvents is the preferred practice.

The compounds of this invention may also be emulsified or suspended in water by adding wettng agents or emulsifying agents to aqueous systems containing one or more of the chemical compounds falling under this disclosure. These emulsified formulations are suitable for use in spraying directly upon the locus sought to be protected from undesirable vegetation. So far as has been determined no significant difference in effect is realized from the use of aqueous emulsified formulations or from organic solvent solutions of these herbicides, providing, of course, that a similar amount of chemical is employed in each instance of use.

So far as concerns the amount of herbicide to be used, this is, of course, subject to such considerations as the type of treatment to be made, the area to be treated, the type of weeds sought to be controlled and the stage of development of the species being sprayed. Generally, however, concentrated herbicidal compositions of the present invention are prepared so as to contain from 5 to about 60% of the active herbicidal component. Compositions which are suitable for "as is" application generally contain from 0.1% to about 10% of active herbicidal component.

Preferred compounds of this invention, being highly active herbicides, may be used at relatively low concentrations as may be seen from the following results:

EXAMPLE 48

A water-ethanol solution of 1,1-dimethyl-4,6-diisopropyl-5-indanylmethylketone was sprayed over soil which was freshly sown to crabgrass (*Digitaria ischaemum*), ryegrass (*Lolium perenne*), barnyard grass (*Echinochloa crusgalli*), Johnson grass (*Sorghum halepense*), witchgrass (*Panicum capillare*), cheat grass (*Bromus secalinus*), wild oats (*Avena fatua*) and foxtail (*Setaria faberii*) seeds. Spraying was effected at a rate equivalent to 3 lbs. of the active herbicidal agent per acre of soil surface. Approximately 2½ weeks after spraying, an inspection of the treated area showed 90 to 100% control of these undesirable grass species as compared to untreated areas.

EXAMPLE 49

1,1-dimethyl-4-ethyl - 7 - isopropyl - 5 - indanylmethylketone, dissolved in a methylated naphthalene-alcohol solution, was sprayed over soil which had been sown to wild oats (*Avena fatua*), crabgrass (*Digitaria ischaemum*), barnyard grass (*Echinochloa crusgalli*) and foxtail (*Setaria faberii*) at such a rate so as to apply the equivalent of 4 lbs. of the herbicidal agent per acre of soil surface. Three weeks after spray application the treated area was inspected and from 90 to 100% control was observed for these weed species as compared to untreated areas.

EXAMPLE 50

An aqueous oil emulsion of 1,1-dimethyl-4,6-diisopropyl-5-indanylethylketone was sprayed over soil which had been sown to wild oats (*Avena fatua*), crabgrass (*Digitaria ischaemum*), foxtail (*Setaria faberii*), barnyard grass (*Echinochloa crusgalli*) and cheat grass (*Bromus secalinus*). Spraying was effected so as to apply the equivalent of 4 lbs. of the chemical compound per acre of soil surface, and at the time of spraying there were no plants growing within the treated area. Approximately 3 weeks after spray application an inspection of the treated area revealed that from 95 to 100% control was obtained over undesirable plant species in comparison with untreated or control areas.

EXAMPLE 51

Field plots were planted with both rice and barnyard grass (*Echinochloa crusgalli*) seeds and were immediately sprayed with aqueous suspensions of 1,1-dimethyl-4,6-diisopropyl-5-indanylethylketone at a rate comparable to 3 pounds of the active chemical agent per acre of soil surface. Approximately 12 weeks after spraying an inspection of the treated area showed that 95% control had been obtained over the barnyard grass with no noticeable injury to the rice crop.

EXAMPLE 52

Field plots of transplanted paddy rice were seeded with barnyard grass (*Echinochloa crusgalli*) and were then sprayed with aqueous emulsions of 1,1-dimethyl-4,6-diisopropyl-5-indanylethylketone so as to yield an application rate comparable to 2 pounds of the active chemical agent per acre of soil surface. The rice plants were approximately eight inches in height at the time of spraying and many of them had 3 to 4 inch tillers. Seven weeks after application of the chemical herbicide an inspection of the treated plots showed 100% control over barnyard grass (*Echinochloa crusgalli*) with no noticeable injury to the rice plants.

If it is desired to effect substantially complete elimination of vegetation through use of one or more compounds of this invention, it is then necessary to apply a higher rate of the chemical agent, for example from 20 to 40 lbs./acre thereof, so as to obtain substantial soil sterilization.

Effective aquatic weed control can be accomplished by very low concentrations of the herbicidal compounds of the present invention as may be demonstrated by the following results:

EXAMPLE 53

The following compounds were each applied to water wherein there was growing emerged aquatic weeds of the water fern (Salvinia rotundifolia) species. Each of the compounds was applied so as to obtain a rate of 10 parts of the active chemical agent per 1 million parts of water:

Compound A—1,1,4,7-tetramethyl-6-isopropyl-5-indanylmethylketone.
Compound B—1,1,4,5-tetramethyl-7-isopropyl-6-indanylmethylketone.
Compound C—1,1,4,6,7-pentamethyl-5-indanylmethylketone.
Compound D—1,1-dimethyl-6-isopropyl-4-indanylmethylketone.
Compound E—1,1,5,6-tetramethyl-4-indanylethylketone.
Compound F—1,1,4,6-tetramethyl-5-indanylethylketone.
Compound G—1,1,4,7-tetramethyl-5-indanylethylketone.

Approximately three weeks after introducing the compounds to the aqueous systems containing the water fern plants, an inspection revealed that from 90 to 100% control was being obtained over the weed species.

Example 54

A rate of 10 parts of 1,1,6-trimethyl-4-ethyl-5-indanylmethylketone was added to each million parts of water wherein there was growing submerged aquatic weeds of the species Elodea canadensis.

Three weeks after adding this compound to the water an inspection revealed that 90% control over the undesirable aquatic weed had been obtained.

The compounds found to be suitable for use in the present invention may be prepared by condensation of a hydrocarbon with a diolefin to form a desired indan followed by acetylation of the indan to yield the acyl indanes falling within the scope of this disclosure. While the preparation of these acyl indanes forms no part of the present invention, and such preparation may be accomplished by various methods, there are presented below illustrations of specific preparations of compounds falling within the scope of this invention.

Example 55.—Preparation of 1,1,4,6,7-pentamethyl-5-indanylmethylketone (Compound No. 5 in Table I)

A solution of 68 parts of isoprene and 118 parts of 1,2,4-trimethylbenzene was added slowly to an admixture of 400 parts of 1,2,4-trimethylbenzene and 185 parts of 93% $H_2SO_4$. The addition was continued for 4 to 5 hours at −6 to 0° C. After completion of the addition, the lower acid layer was separated and the oil layer was washed with dilute NaOH and dilute $NaHCO_3$ solutions. Unreacted 1,2,4-trimethylbenzene was recovered by distillation, and 132 parts of 1,1,4,6,7-pentamethylindan were recovered by reduced pressure distillation.

94 parts of the 1,1,4,6,7-pentamethylindan thus produced were dissolved in 150 mls. of $CCL_4$ and the solution was added slowly to an admixture of 80 parts of anhydrous $AlCl_3$ and 48 parts of acetyl chloride in 500 mls. of $CCL_4$ at a temperature of 1 to 3° C. The addition was continued for 2 to 3 hours after which the reaction mixture was poured over ice. After settling, the lower $CCL_4$ layer was separated and washed with water and with dilute $NaHCO_3$ solution. Upon removal of the $CCL_4$ solvent a crude product (137 parts) was recovered. Recrystallization was effected from ethanol to yield the desired product melting at 64–65° C.

Example 56.—Preparation of 1,1-dimethyl-4,6-diisopropyl-5-indanylmethylketone (Compound No. 17 in Table I)

A solution of 150 parts of isoprene and 200 parts of diisopropylbenzene was added slowly to an admixture of 400 parts of 93% $H_2SO_4$ and 1000 parts of diisopropylbenzene. The addition was continued for the same time and temperature as specified in the foregoing preparation, and separation and recovery of the product was effected in the same manner, resulting in 314 parts of 4,6-diisopropyl-1,1-dimethylindan.

The 4,6-diisopropyl-1,1-dimethylindan was acetylated following the same procedure as specified above, with the exception that ethylene dichloride was used in lieu of $CCL_4$. 690 parts of the indan yielded 637 parts of a crystalline product, after vacuum distillation, which melted at 74–75° C.

Example 57.—Preparation of 1,1-dimethyl-4,6-diisopropyl-5-indanylethylketone (Compound No. 22 in Table I)

4,6-diisopropyl-1,1-dimethylindan, as prepared in Example 56 above, was reacted with propionyl chloride utilizing the acylation technique described above in Example 55 with the exception that ethylene dichloride was substituted for carbon tetrachloride. From 575 grams of the hydrocarbon there was obtained 636 grams of vacuum distilled 1,1-dimethyl-4,6-diisopropyl-5-indanylethylketone having a boiling point of 132–133° C. at 2 mm. After distillation this ketone solidified to a white, waxy product having a congealing point of 84° C. and a melting point of 88° C. Crystallization from methanol yielded a white powder melting at 78–88° C. Analysis by vapor-phase chromatography showed the presence of two isomers. The isometric mixture was subjected to chromatographic resolution to separate the isomers. The major component was obtained in 98% purity and melted at 116–118° C. The minor component was obtained in 96% purity and melted at 92–94° C.

Based on infrared and NMR studies the higher melting isomer was assigned the structure 1,1-dimethyl-4,6-diisopropyl-5-indanyl-ethylketone. The lower melting isomer was identified as 1,1-dimethyl-4,6-diisopropyl-7-indanyl-ethylketone.

Example 58.—Preparation of 1,4-dimethyl-1-ethyl-7-isopropyl-5-indanylmethylketone (Compound No. 31 in Table I)

3-methyl-1-penten-3-ol was dehydrated by the procedure of U.S. Patent 2,381,148 to produce a mixture of 3-methyl-1,3-pentadiene and 2-ethyl-1,3-butadiene, boiling point of 114–118° C. Cyclo-addition of this mixture to p-cymene following the general diolefin-hydrocarbon condensation procedure, as illustrated in Examples 55 and 56, produced 1,4-dimethyl-1-ethyl-7-isopropylindan, a colorless liquid having a boiling point of 93–98° C. and an $n_D^{20}$ of 1.5146. The indan hydrocarbon derivative thus produced was acetylated by the general method of Example 55 to produce the ketone derivative 1,4-dimethyl-1-ethyl-7-isopropyl-5-indanylmethyl-ketone having a boiling point of 137–139° C. at 2 mm. and an $n_D^{20}$ of 1.5336.

Example 59.—Preparation of 4,6-dimethyl-5-indanylmethylketone 5,7-dimethyl-1-indanone was prepared by the combination acylation-alkylation reaction between meta xylene and β-chloropropionyl chloride using the general procedure described by Hart and Tebbe (J. Am. Chem. Soc., 72, 3286 (1950)) in their preparation of 4,7-dimethyl-1-indanone from para xylene. The ketone was obtained as a colorless solid, M.P. 76–79°.

The ketone was reduced by the Wolff-Kishner method (Huang-Minlon modification) using 85% hydrazine hydrate, diethylene glycol solvent and caustic soda flakes to produce the corresponding hydrocarbon, 4,6-dimethylindan, a colorless liquid, B.P. 61° (2 mm.), $n_D^{20}$ 1.5325.

Acetylation of the above hydrocarbon by the method of Example 55, using ethylene dichloride solvent, gave a 95% yield of 4,6-dimethyl-5-indanylmethylketone, a colorless liquid, B.P. 106° (2 mm.), $n_D^{20}$ 1.5459. This ketone showed activity as a pre-emergence herbicide.

Example 60.—Preparation of 4,6,7-trimethyl-5-indanylmethylketone

In similar fashion, starting with pseudocumene (1,2,4-trimethylbenzene), the following compounds were prepared:

(a) 4,5,7-trimethyl-1-indanone, a colorless solid, M.P. 111–113°.
(b) 4,5,7-trimethylindan, a colorless material, B.P. 79° (1 mm.), which solidified immediately after distillation, M.P. 46–47°.
(c) 4,5,7-trimethyl-6-indanylmethylketone, a colorless solid, M.P. 62–64° (from methanol). This compound was active as a pre-emergence herbicide.

Example 61.—Preparation of 6-isopropyl-1,1,4-trimethyl-5-indanealdehyde (a) *5-chloromethyl-6-isopropyl-1,1,4-trimethylindan.*— A mixture of 28 g. of zinc chloride, 41.5 g. of paraformaldehyde and 202 g. of 6-isopropyl-1,1,4-trimethylindan was heated with stirring to 65° C. and dry hydrogen chloride was passed into the mixture during one hour and 40 minutes at 65–75° C. There was consumed 56 g. of hydrogen chloride.

The solution was cooled to 30° C. and the lower layer, 58 g., separated and the upper layer stirred 15 minutes with 18 g. of sodium bicarbonate. The solution was filtered and the filtrate vacuum-distilled in the presence of 2 g. of anhydrous soda ash. There was collected, in addition to 64 g. of recovered 6-isopropyl-1,1,4-trimethylindan, 143 g. of 5-chloromethyl-6-isopropyl-1,1,4-trimethylindan as a colorless oil boiling at 112° C./0.5 mm. Hg; $n_D^{20}$ 1.5375.

(b) *5-formyl-6-isopropyl-1,1,4-trimethylindan.*—A mixture of 135 g. of 5-chloromethyl-6-isopropyl-1,1,4-trimethylindan, 261 g. of acetic acid, 175 g. of water and 244 g. of hexamethylene tetramine was refluxed for 3 hours with agitation.

261 g. of 37% hydrochloric acid was added and the solution refluxed for 45 min. with agitation. The mixture was cooled and the oil which separated was taken up in benzene and washed neutral. After removal of benzene by distillation the remaining oil was fractioned through a 9″ packed column and the main product, a viscous oil was obtained, B.P. 121–124° C. This oil crystallized and was purified by crystallization from methanol. The desired aldehyde was a white crystalline compound, M.P. 78.5–80.1° C. The product has a musk odor and is effective as a pre-emergence herbicide showing a high degree of selectivity.

In a similar manner, various other compounds falling within the scope of this invention may be prepared. It has been found that herbicidal activity is demonstrated by products recovered by vacuum distillation, and that further purification of the compounds is not required.

What is claimed is:

1. A method of controlling weeds comprising applying to the locus to be protected a herbicidally effective amount of a compound of the formula:

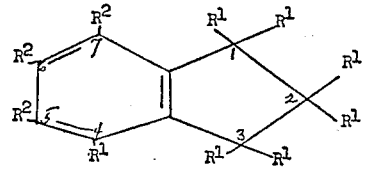

wherein $R^1$ ie selected from the group consisting of hydrogen and alkyl groups of from 1 to 3 total carbon atoms with the proviso that at least one of the $R^1$ groups is hydrogen; and wherein $R^2$ is selected from the group consisting of hydrogen, alkyl groups of from 1 to 6 total carbon atoms and lower alkanoyl groups, with the proviso that one of the $R^2$ groups must be a lower alkanoyl group, and at least one $R^2$ group must be an alkyl group, with the further proviso that where only one $R^2$ is alkyl it has from 1 to 3 carbon atoms.

2. The method of claim 1 wherein the compounds is 1,1-dimethyl-4,6-diisopropyl-5-indanylethylketone.
3. The method of claim 1 wherein the compound is 1,1-dimethyl-4,6-diisopropyl-7-indanylethylketone.
4. The method of claim 1 wherein the compound is 1,1,6-trimethyl-4-ethyl-5-indanylmethylketone.
5. The method of claim 1 wherein the compound is 1,1,2,4,6-pentamethyl-5-indanylmethylketone.
6. The method of claim 1 wherein the compound is 1,1,4,6-tetramethyl-5-indanylethylketone.
7. The method of claim 1 wherein the compound is 1,1-dimethyl-4,6-diisopropyl-5-indanylisopropylketone.

References Cited

UNITED STATES PATENTS 3,152,192  10/1964  Wood et al. _____ 260—668
3,240,829  3/1966  Wood et al. _____ 260—668

FOREIGN PATENTS 796,129  6/1958  Great Britain.

LEWIS GOTTS, *Primary Examiner.*

G. HOLLRAH, *Assistant Examiner.*

UNITED STATES PATENT OFFICE
CERTIFICATE OF CORRECTION

Patent No. 3,393,994                            July 23, 1968

Nancy E. Achuff et al.

It is certified that error appears in the above identified patent and that said Letters Patent are hereby corrected as shown below:

Column 3, line 50, "wettng" should read -- wetting --.
Column 8, lines 21 and 25, after "consisting", each occurrence, insert -- essentially --; line 21, "ie" should read -- is --; same column 8, lines 12 to 20, in the structural formula, in the aromatic ring, "$R_1$" should read -- $R_2$ --.

Signed and sealed this 20th day of January 1970.

(SEAL)
Attest:

Edward M. Fletcher, Jr.                      WILLIAM E. SCHUYLER, JR.

Attesting Officer                               Commissioner of Patents